UNITED STATES PATENT OFFICE 1,960,351

MANUFACTURE OF DYES OF THE AZINE SERIES

Otto Siebert and Walther Benade, Dessau-in-Anhalt, Germany, assignors to General Aniline Works, Inc., New York, N. Y., a corporation of Delaware No Drawing. Application July 16, 1930, Serial No. 468,450. In Germany August 12, 1929

14 Claims. (Cl. 260—29)

This invention relates to a process of manufacturing wool dyes and to the new products obtainable by this process.

We have found that new valuable dyes are obtainable by the action of one molecular proportion of a compound of the benzene series having two nitro-groups in ortho-position and one nitro-group in para-position to an atom or an atomic group capable of exchange upon one molecular proportion of a compound of the type

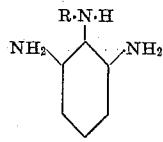

(that is to say, a secondary amine of the benzene series which contains two primary amino-groups in ortho-position to the secondary amino-group) which contains at least one sulfo-group. A diphenylamine derivative is first formed which after a prolonged heating in an alkaline solution undergoes condensation, alkali nitrite being split off. The reaction may be illustrated by the following equations

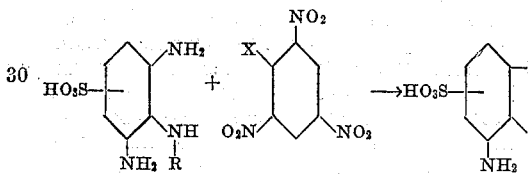

According to the nature of the substituents, yellowish-brown to violet-brown acid wool dyes are formed which are distinguished by their good levelling power and their very good fastness to light.

In the above formulæ R stands for any radicle of the aromatic, hydroaromatic, heterocyclic or aliphatic series and X stands for a substituent capable of exchange; the benzene nucleus may contain any desired substituents.

The following examples illustrate the invention the parts being by weight:

*Example 1.*—27.9 parts of 2.6-diaminodiphenylamine-4-sulfonic acid, obtainable by condensing 2.6-dinitrochlorobenzene - 4 - sulfonic acid with aniline and reducing the nitro-groups, are dissolved in 500 parts of water to form a neutral solution and, at 70° C. to 80° C. condensed with 24 parts of 2.4.6-trinitro-anisol, which are gradually added while stirring. A solution of 6 parts of anhydrous sodium carbonate in 60 parts of water is simultaneously added drop by drop. After all of the trinitro-anisol has been consumed, another 6 parts of anhydrous sodium carbonate are added and the mass is heated for some time up to 90° C. The dye is separated by salting it out; when dry it is a black powder, dyeing wool yellowish-brown well levelling tints of very good fastness to light. It has the formula

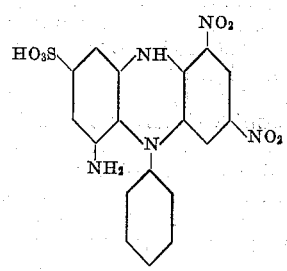

When substituting for the diphenylamine derivative used in the foregoing Example 1 obtainable from a substitution product of aniline, for instance 4-phenetidine, 4-anisidine, 4-toluidine or the like, dyes are obtained which dye wool tints of a somewhat more reddish hue.

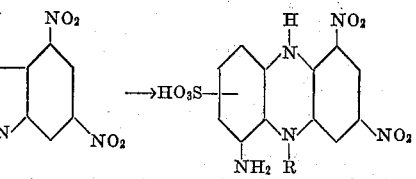

When the 2-substitution products, such as 2-chloraniline, 2-phenetidine or 2-anisidine are used, dyes of distinctly reddish-brown tints are obtained. Brownish-violet tints are obtained by using bases such as for instance 2-amino-1.4-xylene or 4-amino-1.3-xylene.

*Example 2.*—29.3 parts of 3'-methyl-2.6-diaminodiphenylamine-4-sulfonic acid, obtainable by condensing 2.6-dinitrochlorobenzene-4-sulfonic acid with 1-amino-3-methylbenzene and reducing the nitro-groups are dissolved in 500 parts of water, and, at 70° C. to 80° C., condensed with 24 parts of 2.4.6-trinitro-anisol gradually added while stirring. Simultaneously, a solution of 6 parts of anhydrous sodium carbonate in 60 parts of water is added drop by drop. After all of the trinitro-anisol has been consumed, 6 parts of anhydrous sodium carbonate are furthermore added and the mass is heated for some time up to 90° C. The dye is salted out from the solution; when dry it forms a black powder, dyeing wool brown well levelling tints of very good fastness to light. It has the chemical formula

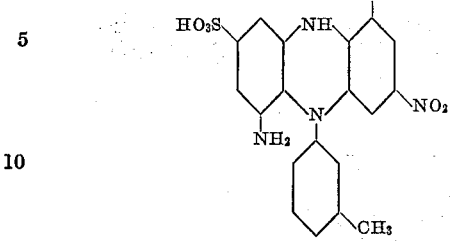

4'-methyl-2.6-diaminodiphenylamine - 4 - sulfonic acid obtainable by condensing 2.6-dinitrochlorobenzene-4-sulfonic acid with 4-methyl-1-aminobenzene and reducing the nitro-groups, yields when condensed with 2.4.6-trinitro-anisol in a substantially analogous manner a dye of similar qualities.

By condensing corresponding parts of 4'-methoxy-2.6-diaminodiphenylamine - 4 - sulfonic acid or of 4'-ethoxy-2.6-diaminodiphenylamine-4-sulfonic acid (these starting materials being obtainable by condensation of 2.6-dinitrochlorobenzene-4-sulfonic acid with 4-methoxy-1-aminobenzene or 4-ethoxy-1-aminobenzene, respectively, and reduction of the nitro-groups) in the manner described in the foregoing examples dyes are obtainable forming when dry black powders, dying wool reddish-brown well levelling tints of very good fastness to light.

*Example 3.*—31.35 parts of 2'-chloro-2.6-diaminodiphenylamine-4-sulfonic acid (obtainable by condensing 2.6-dinitrochlorobenzene-4-sulfonic acid with 2-chloro-1-aminobenzene and reducing the nitro-groups) are treated with 24 parts of 2.4.6-trinitro-anisol as described in Example 2 whereby a dye is obtained forming a black powder and dyeing wool red-brown tints. It has the formula

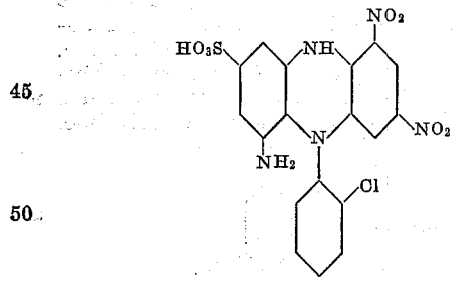

*Example 4.*—25.9 parts of 2.6-diamino-4-sulfophenyl-n-butylamine, obtainable by condensation of 2.6-dinitro-1-chlorobenzene-4-sulfonic acid with n-butylamine and subsequent reduction, are dissolved in 500 parts of water to form a neutral solution and gradually caused to react at 70° C.-80° C. with 24 parts of 2.4.6-trinitro-1-chlorobenzene, while adding 12 parts of anhydrous sodium carbonate. When all trinitrochlorobenzene has been consumed, 6 parts of anhydrous sodium carbonate are furthermore added and the mass is heated for some time to 90° C. The dye is separated by salting it out; it dyes wool reddish-brown tints. It has the formula

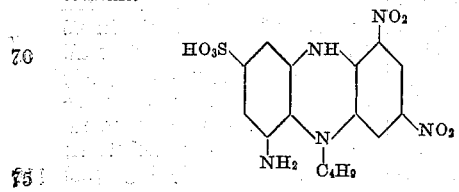

*Example 5.*—31.35 parts of 2.6-diamino-4-chlorodiphenylamine-3'-sulfonic acid, obtainable by condensing 1.4-dichloro-2.6-dinitro-benzene with 1-aminobenzene-3-sulfonic acid and reducing the nitro-groups, are condensed in the manner set forth in Example 1 with 24 parts of 2.4.6-trinitroanisol. The dye dyes wool clear yellowish brown well levelling tints of excellent fastness to light. It has the formula

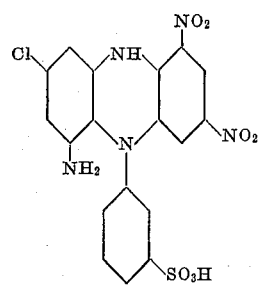

*Example 6.*—39 parts of the reduced condensation product of 28.2 parts of 2.6-dinitro-1-chlorobenzene-4-sulfonic acid and 20.3 parts of 4-aminoantipyrine (4-aminophenyldimethylpyrazolene) are gradually caused to react at 70° C. to 80° C. with 24 parts of 2.4.6-trinitroanisol while adding 6 parts of anhydrous sodium carbonate. After the further addition of 6 parts of anhydrous sodium carbonate, the mass is heated for some time to 90° C. The dye is salted out and dried. It dyes wool reddish-brown tints of good properties of fastness. It has the formula

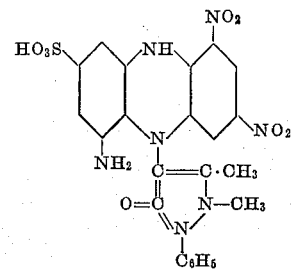

Our present invention is not limited by the foregoing examples or by the specific details given therein. Thus, for instance, we may use instead of sodium carbonate another alkaline condensing agent. As mentioned above the benzene nuclei may bear other substituents. Furthermore the position of the sulfonic acid radicle may be modified. The process of preparing our new products, however, is always identical with that described in the examples.

The same holds true with respect to the selection of the triamine of the benzene series. In the foregoing examples we have indicated as starting materials triamino compounds of the benzene series in which an amino group is substituted by phenyl, tolyl, xylyl, alkoxyphenyl, chlorophenyl, sulfophenyl, butyl, or by the phenyl dimethyl pyrazolone radicle. Other triamino benzene compounds substituted in an amino group by other substituents such as hydroaromatic radicles, alkyl radicles other than butyl, or heterocyclic radicles other than pyrazolone, may likewise be used and are considered to be equivalents of the substituents mentioned above and to be in the scope of our invention and of the claims following hereafter.

What we claim is:
1. The process which comprises condensing one molecular proportion of a compound corresponding to the general formula

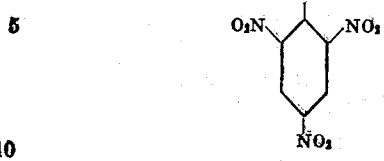

wherein X means halogen or alkoxy, with one molecular proportion of a triamine of the benzene series corresponding to the general formula

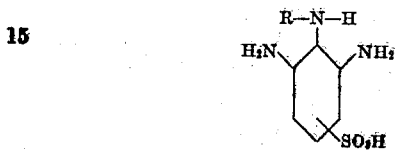

wherein R stands for phenyl, alkylphenyl, alkoxyphenyl, halogenophenyl, phenylsulfonic acid or for alkyl, and further condensing the intermediate product formed to form an N-dihydrophenazine compound.

2. The process which comprises condensing one molecular proportion of 1-methoxy-2.4.6-trinitrobenzene with one molecular proportion of a triamine of the benzene series corresponding to the general formula

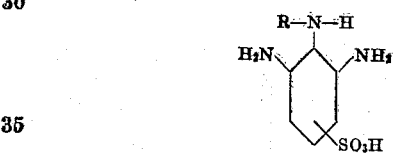

wherein R stands for phenyl, alkylphenyl, alkoxyphenyl, halogenophenyl, phenylsulfonic acid or for alkyl, and further condensing the intermediate product formed to form an N-dihydrophenazine compound.

3. The process which comprises condensing one molecular proportion of 1-methoxy-2.4.6-trinitrobenzene with one molecular proportion of a triamine of the benzene series corresponding to the general formula:

wherein R stands for a radicle of the benzene series.

4. The process which comprises condensing one molecular proportion of 1-methoxy-2.4.6-trinitrobenzene with one molecular proportion of 2.6-diaminodiphenylamine-4-sulfonic acid, and further condensing the intermediate product formed to form an N-dihydrophenazine compound.

5. The process which comprises acting upon an aqueous solution of one molecular proportion of a compound corresponding to the general formula

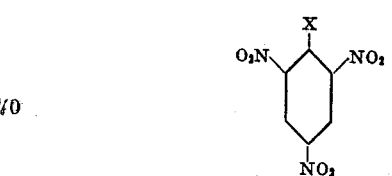

wherein X means halogen or alkoxy, in the presence of an alkali with one molecular proportion of a triamine of the benzene series corresponding to the general formula

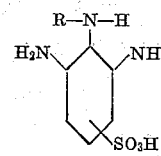

wherein R stands for phenyl, alkylphenyl, alkoxyphenyl, halogenophenyl, phenylsulfonic acid or for alkyl, adding a further quantity of an alkali and carrying the condensation to an end.

6. The process which comprises acting upon an aqueous solution of one molecular proportion of 1-methoxy-2.4.6-trinitrobenzene in the presence of an alkali with one molecular proportion of a compound corresponding to the general formula:

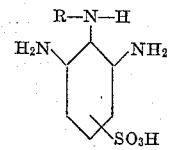

wherein R stands for a radicle of the benzene series, adding a further quantity of an alkali and carrying the condensation to an end.

7. The process which comprises acting upon an aqueous solution of one molecular proportion of 1-methoxy-2.4.6-trinitrobenzene with one molecular proportion of 2.6-diaminodiphenylamine-4-sulfonic acid in the presence of an alkali, adding a further quantity of an alkali and carrying the condensation to an end.

8. The process which comprises adding to a neutral aqueous solution of about 27.9 parts of 2.6-diaminodiphenylamine-4-sulfonic acid simultaneously about 24 parts of 2.4.6-trinitro-1-methoxybenzene and an aqueous solution of about 6 parts of anhydrous sodium carbonate at a temperature of about 70 to 80° C., adding a further quantity of anhydrous sodium carbonate and carrying the condensation to an end at a temperature of about 90° C.

9. The dyes having the general formula

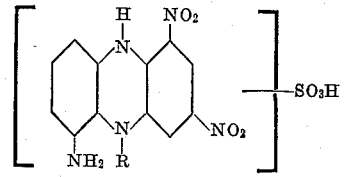

wherein R stands for phenyl, alkylphenyl, alkoxyphenyl, halogenophenyl, phenlysulfonic acid or for alkyl, these dyes being in the dry state black powders, soluble as alkali metal salts in water and dyeing wool in brown, yellow-brown or red-brown well levelling tints of very good fastness to light.

10. The dyes having the general formula:

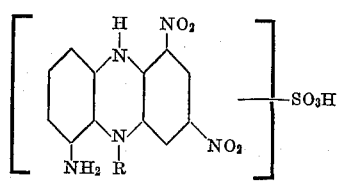

wherein R stands for a radicle of the benzene series, these dyes being in the dry state black powers, soluble as alkali metal salts in water and dyeing wool in brown, yellow-brown or red-brown well levelling tints of very good fastness to light.

11. The dyes having the general formula

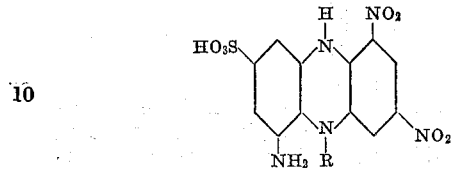

wherein R stands for phenyl, alkylphenyl, alkoxyphenyl, halogenophenyl, phenylsulfonic acid or for alkyl, these dyes being in the dry state black powders, soluble as alkali metal salts in water and dyeing wool in brown, yellow-brown or red-brown well levelling tints of very good fastness to light.

12. The dye having the formula

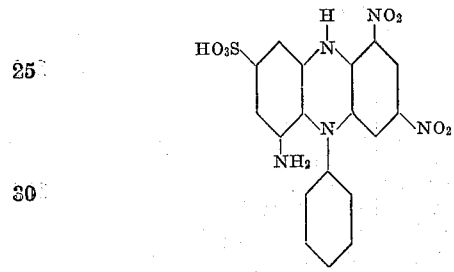

forming in the dry state a black powder, soluble as alkali metal salt in water and dyeing wool yellowish-brown well levelling tints of very good fastness to light.

13. The dye having the formula:

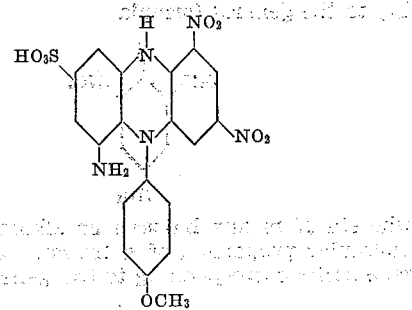

forming in the dry state a black powder, soluble as alkali metal salt in water and dyeing wool reddish-brown well levelling tints of very good fastness to light.

14. The dye having the formula:

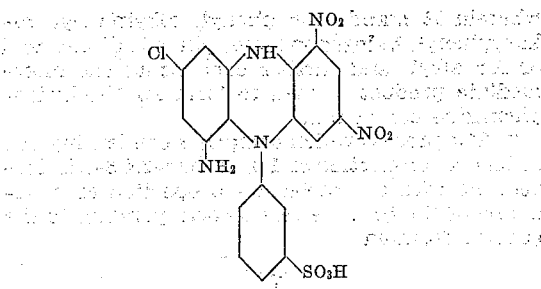

forming in the dry state a black powder, soluble as alkali metal salt in water and dyeing wool yellowish-brown well levelling tints of very good fastness to light.

OTTO SEIBERT.
WALTHER BENADE.